US008098961B2

(12) United States Patent
Ida et al.

(10) Patent No.: US 8,098,961 B2
(45) Date of Patent: Jan. 17, 2012

(54) RESOLUTION ENHANCEMENT APPARATUS AND METHOD

(75) Inventors: Takashi Ida, Kawasaki (JP); Nobuyuki Matsumoto, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1056 days.

(21) Appl. No.: 11/953,370

(22) Filed: Dec. 10, 2007

(65) Prior Publication Data

US 2008/0267533 A1 Oct. 30, 2008

(30) Foreign Application Priority Data

Apr. 26, 2007 (JP) ................. 2007-117345

(51) Int. Cl.
G06K 9/48 (2006.01)
G06K 9/32 (2006.01)
(52) U.S. Cl. ...................... 382/299; 382/199
(58) Field of Classification Search .............. 382/199, 382/298–299, 300, 305, 312; 375/660; 348/20.99
See application file for complete search history.

(56) References Cited

U.S. PATENT DOCUMENTS

| 5,917,963 | A | * | 6/1999 | Miyake | 382/300 |
|---|---|---|---|---|---|
| 6,408,109 | B1 | * | 6/2002 | Silver et al. | 382/300 |
| 7,362,900 | B2 | * | 4/2008 | Urano et al. | 382/199 |
| 7,379,625 | B2 | * | 5/2008 | Wang et al. | 382/300 |
| 7,764,848 | B2 | * | 7/2010 | Ida et al. | 382/299 |
| 7,869,665 | B2 | * | 1/2011 | Chen et al. | 382/300 |
| 7,876,979 | B2 | * | 1/2011 | Lee et al. | 382/300 |
| 2003/0185464 | A1 | * | 10/2003 | Maenaka et al. | 382/300 |
| 2005/0094899 | A1 | * | 5/2005 | Kim et al. | 382/300 |
| 2008/0107356 | A1 | | 5/2008 | Matsumoto | |

FOREIGN PATENT DOCUMENTS

JP 2000-188680 7/2000

OTHER PUBLICATIONS

Masao Shimizu, et al., "Sub-Pixel Estimation Error Cancellation on Area-Based Matching", International Journal of Computer Vision, vol. 63, No. 3, XP019216471, Jul. 1, 2005.*
S. Park et al., "Super-Resolution Image Reconstruction: A Technical Overview", *IEEE Signal Processing Magazine*, May 2003, pp. 21-36.

(Continued)

*Primary Examiner* — Gregory M Desire
*Assistant Examiner* — Andrae S Allison
(74) *Attorney, Agent, or Firm* — Nixon & Vanderhye, PC

(57) ABSTRACT

A resolution enhancement apparatus includes unit to acquire a first image, unit to perform edge emphasis on the first image to obtain a second image, unit to detect, using one of the first image and the second image, points corresponding to image regions at a precision of a sub-pixel unit as a unit smaller than an interval between neighboring pixels, unit to set each of second values of the second image as a sampling value of a luminance value at each point when one of the second pixels is used as a pixel of interest, unit to enlarge the first image into a high-resolution image including a larger number of third pixels than the first image, and unit to execute value conversion which adds or subtracts third values in the high-resolution image in a direction to reduce errors between the luminance values sampled at the points and the sampling values.

17 Claims, 11 Drawing Sheets

OTHER PUBLICATIONS

M. Shimizu, et al., "Significance and Attributes of Sub-Pixel Estimation on Area-Based Matching", *Trans. Ins, Electron., Inform. Commun., Eng. D-II*, vol. J85-D-II, No. 12, Dec. 2002, pp. 1791-1800 (Translation).

Takagi et al., "Handbook of Image Analysis", *University of Tokyo Press*, p. 443 and p. 549 (discussed in specification).

Suematsu et al, "Image Processing Engineering", *Corona Publishing Co., Ltd.*, pp. 60-65 (discussed in specification).

U.S. Appl. No. 11/558,219, filed Nov. 9, 2006.

U.S. Appl. No. 11/677,719, filed Feb. 22, 2007.

U.S. Appl. No. 11/695,820, filed Apr. 3, 2007.

U.S. Appl. No. 11/461,662, filed Aug. 1, 2006.

U.S. Appl. No. 12/026,674, filed Feb. 6, 2008.

U.S. Appl. No. 11/828,397, filed Jul. 26, 2007.

Takagi et al., "Handbook of Image Analysis", *University of Tokyo Press,* p. 443 and p. 549 (discussed in specification) (1991).

Suematsu et al, "Image Processing Engineering", *Corona Publishing Co., Ltd.,* pp. 60-65 (discussed in specification) (2000).

\* cited by examiner

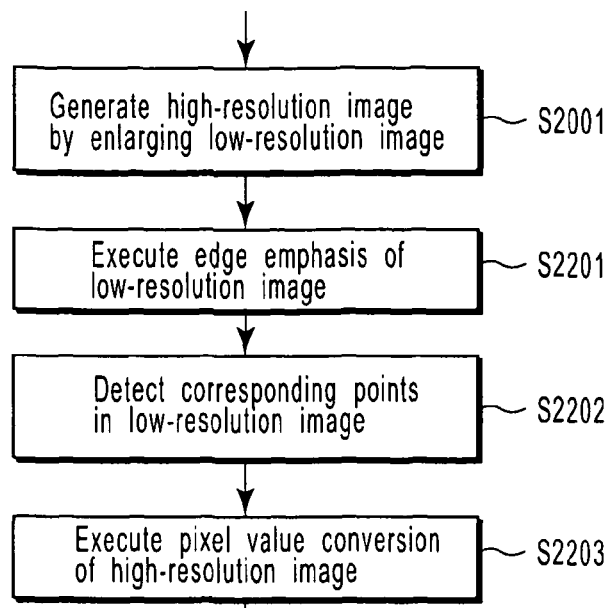
F I G. 22
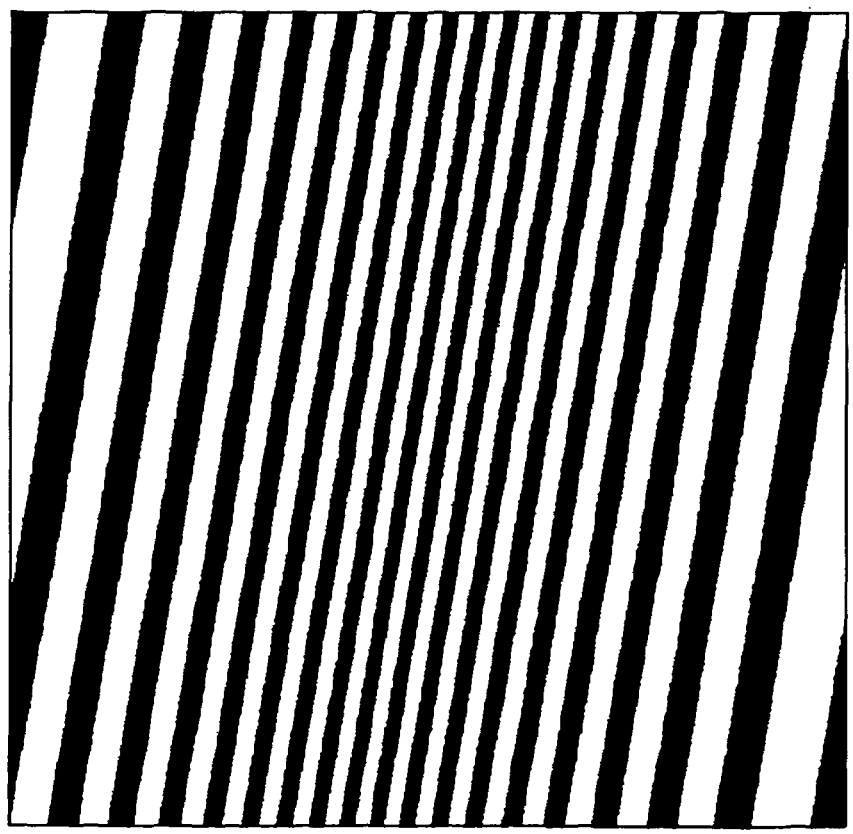
F I G. 23

RESOLUTION ENHANCEMENT APPARATUS AND METHOD

CROSS-REFERENCE TO RELATED APPLICATIONS

This application is based upon and claims the benefit of priority from prior Japanese Patent Application No. 2007-117345, filed Apr. 26, 2007, the entire contents of which are incorporated herein by reference.

BACKGROUND OF THE INVENTION

1. Field of the Invention

The invention relates to a resolution enhancement apparatus and method, which convert image data captured by a camera or received by a television into image data with a higher resolution.

2. Description of the Related Art

Televisions and displays with large numbers of pixels, i.e., with high resolutions, are highly popular. Upon displaying an image, a television or display converts the number of pixels of image data into that of a panel. Especially, in resolution enhancement conversion that increases the number of pixels, a multi-frame degradation inverse conversion method is known as a method of obtaining an image sharper than a linear interpolation method (for example, see JP-A 2000-188680 (KOKAI) (pp. 3-7, FIG. 22), and S. Park, et. al. "Super-Resolution Image Reconstruction: A Technical Overview," IEEE Signal Processing Magazine, USA, IEEE, May 2003, p. 21-36).

The multi-frame degradation inverse conversion method pays attention Lo the fact that an object which appears in a reference frame also appears in another frame, and detects a motion of the object with high precision of a pixel interval or less, thus enhancing the resolution by calculating a plurality of sampling values whose positions deviate very little from an identical local portion of the object.

The multi-frame degradation inverse conversion method will be described in more detail below. This method sequentially converts a time-series sequence of low-resolution frames into high-resolution frames. For example, three time-series frames of a moving image obtained by capturing a moving automobile are used as low-resolution images, and resolution enhancement is attained using one frame from these three frames as a reference frame. For example, the resolution of this frame is enhanced to ×2 in the vertical direction and ×2 in the horizontal direction. With respect to unknown pixels of a high-resolution image, pixels of a low-resolution image, i.e., known sampling values are sparse. In this state, the pixel values of the high-resolution image can be estimated. However, when the number of known sampling values is increased in advance, a more precise high-resolution image can be obtained. For this purpose, the multi-frame degradation inverse conversion method detects a position, in an image plane of the reference frame, of an object which appears at a given pixel position of a low-resolution image other than the reference frame, and uses that pixel value as a sampling value at the corresponding point in the reference frame.

More specifically, for example, a square block, which includes a given pixel as the center, and one side of which is defined by several pixels, is extracted from a low-resolution image, and the reference frame is searched for a portion which has a size the same as this block and includes pixel values close to those of the extracted block. This search is conducted at a sub-pixel precision (for example, see Shimizu and Okutomi, "Significance and Attributes of Sub-Pixel Estimation on Area-Based Matching", The transactions of the Institute of Electronics, Information and Communication Engineers, D-II, the Institute of Electronics, Information and Communication Engineers, December 2002, Vol. 85, No. 12, pp. 1791-1800). The center of the found corresponding block is defined as a corresponding point. In this manner, a point A of an image plane corresponding to another frame is associated with a point B of an image plane corresponding to the reference frame as an identical position of an identical object. This association is expressed by a motion vector having the point A as a start point and the point B as an end point. Since the search is done at a sub-pixel precision, generally the start point of the motion vector is on a pixel position, and the end point is on a position where no pixel exists. Such motion vector is calculated for all pixels of the low-resolution image, and motion vectors to the reference frame having each pixel as the start point are similarly detected for other low-resolution images. Next, the pixel values of the start points are allocated as sampling values at the end points of the respective motion vectors. Finally, uniformly allocated pixel values of a high-resolution image are calculated from the nonuniformly allocated sampling values. As this scheme, nonuniform interpolation, a POCS method, and the like are known (for example, see JP-A 2000-186680 (KOKAI) (pp. 3-7, FIG. 22), and S. Park, et. al. "Super-Resolution Image Reconstruction: A technical Overview," IEEE Signal Processing Magazine, USA, IEEE, May 2003, p. 21-36).

As described above, the multi-frame degradation inverse conversion method can produce a sharp high-resolution image when an image captured by a camera is input without any modification. However, when an image like a received television image, which is sampled by a camera and then undergoes image compression, noise removal filtering, and the like is input, since pixel values have changed from sampling values, the method cannot produce a sufficiently sharp image.

BRIEF SUMMARY OF THE INVENTION

In accordance with an aspect of the invention, there is provided a resolution enhancement apparatus comprising: an acquisition unit configured to acquirer from an image source, a first low resolution image in which luminance values at positions of first pixels included in an image plane of the first low resolution image are expressed as first pixel values; an emphasis unit configured to perform edge emphasis processing on the first low resolution image to obtain a second low-resolution image; a low detection unit configured to detect, using one of the first low resolution image and the second low resolution image, a plurality of corresponding points corresponding to a plurality of image regions each of which is closest to a pixel value pattern included in an interest image region in the first low-resolution image at a precision of a sub pixel unit as a unit smaller than an interval between neighboring pixels, the interest image region being set to have each of the first pixels as a pixel of interest; a setting unit configured to set each of a plurality of second pixel values of the second low resolution image as a sampling value of a luminance value at each corresponding point when one of the second pixels is used as a pixel of interest to obtain a plurality of sampling values; an enlargement unit configured to enlarge the first Low resolution image into a high resolution image including a larger number of third pixels than the first low resolution image; and a conversion unit configured to execute pixel value conversion which adds or subtracts a plurality of third pixel values in the high resolution image using the third pixels in a direction to reduce errors between the luminance values sampled at the corresponding points and the sampling values.

BRIEF DESCRIPTION OF THE SEVERAL VIEWS OF THE DRAWING

FIG. 22 is a flowchart showing an example of the operation of the resolution enhancement apparatus shown in FIG. 21;

FIG. 23 shows an original image as a high-resolution image before processing;

DETAILED DESCRIPTION OF THE INVENTION

Figure 1:
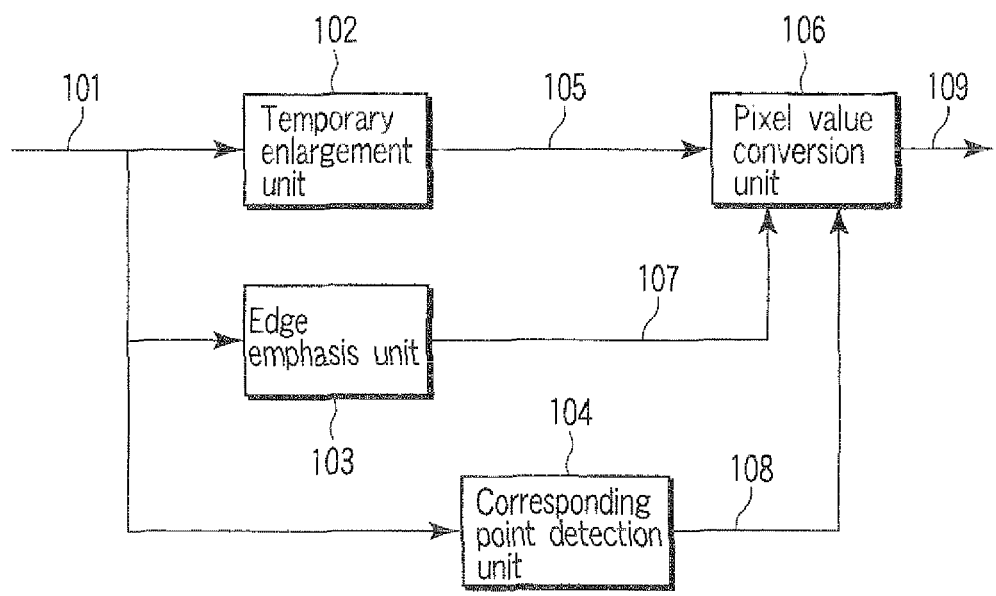
FIG. 1 is a block diagram showing a resolution enhancement apparatus according to the first embodiment.

A resolution enhancement apparatus and method according to embodiments of the invention will be described in detail hereinafter with reference to the accompanying drawings. Note that parts denoted by the same reference numerals perform the same operations, and a repetitive description thereof will be avoided in the embodiments to be described hereinafter.

According to the resolution enhancement apparatus and method of the embodiments, even when a degraded image is input, a sharp high-resolution image can be obtained.

First Embodiment

A resolution enhancement apparatus according to the first embodiment will be described below with reference to FIG. 1.

The resolution enhancement apparatus of this embodiment includes a temporary enlargement unit 102, edge emphasis unit 103, corresponding point detection unit 104, and pixel value conversion unit 106. Note that the resolution enhancement apparatus acquires low-resolution image data 101 from an image source. In this case, the low-resolution image data corresponds to luminance or color values For respective pixels allocated on an image plane, and may be either a moving image or still image. For example, the low-resolution image data includes image data obtained by receiving television broadcast data, image data or photo data captured by a video camera, and the like. In the case of a still image, resolution enhancement processing is applied to each image plane or each partial image plane obtained by dividing one image plane such as one still image itself, one frame for a moving image of a progressive format, or one field for a moving image of an interlaced format.

The temporary enlargement unit 102 acquires the low-resolution image data 101, and passes temporary enlarged image data 105 obtained by enlarging the image data 101 by increasing the number of pixels to the pixel value conversion unit 106. Details of the temporary enlargement unit 102 will be described later with reference to FIGS. 2 to 4.

The edge emphasis unit 103 acquires the low-resolution image data 101, and passes image data 107 whose high-frequency components are emphasized to the pixel value conversion unit 106. The edge emphasis unit 103 detects high-frequency components of the low-resolution image, and applies stronger edge emphasis to the image with fewer high-frequency components. Details of the edge emphasis unit 103 will be described later with reference to FIGS. 5 to 8.

The corresponding point detection unit 104 acquires the low-resolution image data 101, detects the position of a corresponding point for each pixel, and passes position information 108 of the corresponding point to the pixel value conversion unit 106. In general, one pixel has a plurality of corresponding points. Note that a corresponding point means a point (position) where a surrounding pixel value pattern having a given pixel as the center is the same as that having its corresponding point as the center. Details of the corresponding point detection unit 104 will be described later with reference to FIGS. 9 to 17.

The pixel value conversion unit 106 sequentially converts the pixel values of respective pixels of the temporary enlarged image data 105 using low-resolution image data 107 whose high-frequency components are emphasized, and the position information 108 for each pixel of the low-resolution image, thus gradually sharpening the image. Details of the pixel value conversion unit 106 will be described Later with reference to FIGS. 4, 18, and 19.

Figure 3:
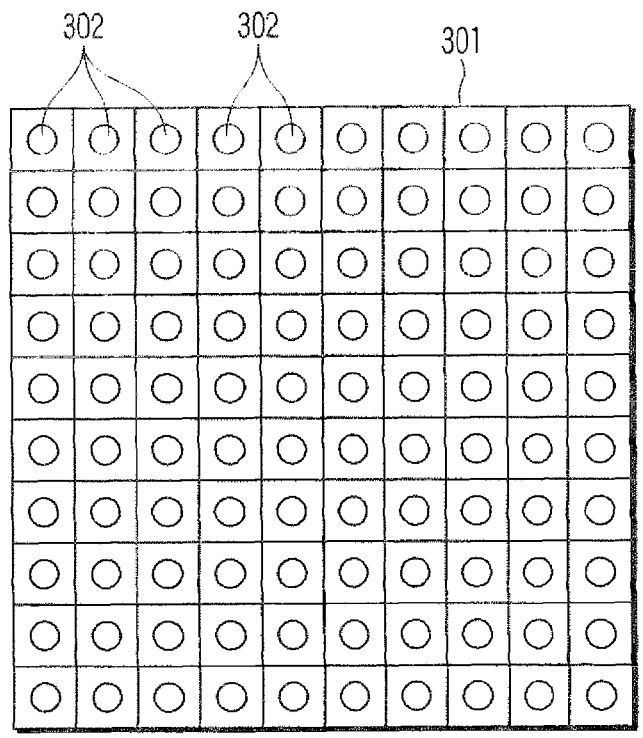
FIG. 3 shows an image obtained by doubling the resolution of the image in FIG. 2 in the vertical and horizontal directions.
Figure 4:
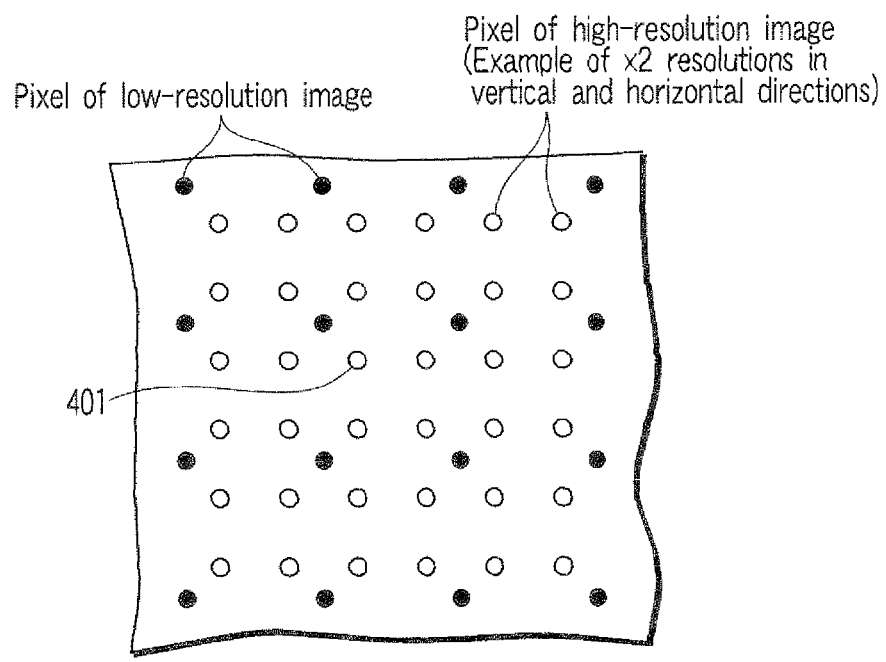
FIG. 4 shows the positional relationship between the pixels shown in FIGS. 2 and 3.

The temporary enlargement unit 102 will be described below with reference to FIGS. 2 to 4.

The temporary enlargement unit 102 converts the low-resolution image data 101 into a desired output resolution using, e.g., ternary convolution interpolation (see Takagi and Shimoda ed. "Handbook of Image Analysis", University of Tokyo Press, p. 443). That is, the image data 101 is enlarged by increasing the number of pixels, and is sent as temporary enlarged image data 105 to the pixel value conversion unit 106.

Figure 2:
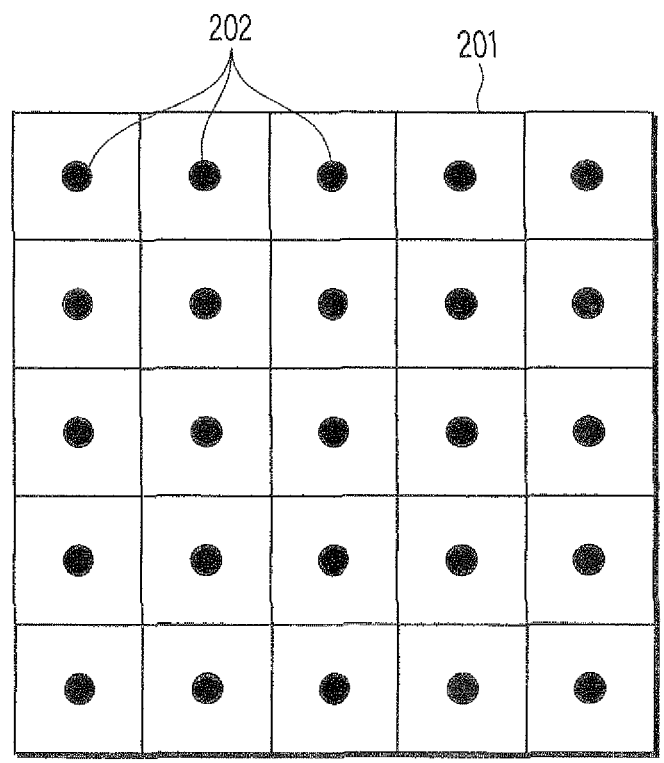
FIG. 2 shows the allocation of pixels on an image plane of a low-resolution image.

FIG. 2 shows the allocation of pixels 202 on an image plane 201 of a low-resolution image. FIG. 3 shows an image obtained by capturing the same image as that in FIG. 2 and has a resolution double in both the vertical and horizontal directions. An image plane 301 is obtained by capturing the same range as the image plane 201 of FIG. 2, and pixels 302 are allocated in this image plane 301 denser than those in FIG. 2. FIG. 4 shows a relative positional relationship between the pixels (FIG. 2) of the low-resolution image and that of a high-resolution image (FIG. 3). The temporary enlargement unit 102 receives pixel values of the pixels (closed dots) of the low-resolution image and calculates those of the pixels (open dots) of the high-resolution image based on the received pixel values. For example, as for a pixel 401 of the high-resolution image, the ternary convolution interpolation method calculates the weighted mean of 16 low-resolution pixel values around that pixel 401 as the pixel value of the pixel 401. The weights of the weighted mean are determined according to the distances between the pixel 401 and those pixels. The weighted means of other pixels are similarly calculated. Note that this temporary enlarged image data 105 is not sharp yet.

The edge emphasis unit 103 shown in FIG. 1 will be described below with reference to FIGS. 5 to 8.

The edge emphasis unit 103 applies, e.g., unsharp masking to the low-resolution image data 101 to emphasize its high-frequency components. Unsharp masking is processing for emphasizing an edge part by calculating the difference between an input image and an image obtained by blurring the input image, and adding the difference to the original image (see Takagi and Shimoda ed. "Handbook of Image Analysis", University of Tokyo Press, p. 549). The image data 107 whose high-frequency components are emphasized is sent to the pixel value conversion unit 106.

Figure 5:
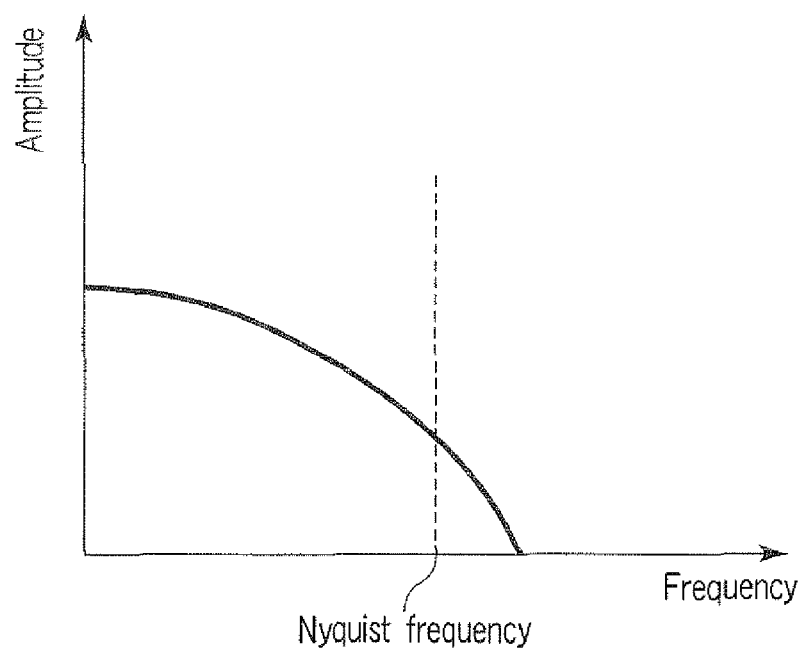
FIG. 5 is a graph showing the Fourier transformation spectrum of high-resolution image data.

The effect of this edge emphasis will be described below. FIG. 5 shows the Fourier transformation spectrum of high-resolution image data. The vertical axis plots the spatial frequency, and the horizontal axis plots the amplitude of a Fourier transformation coefficient. Assume that a certain high-frequency image has a spectrum shown in FIG. 5. Also, the Nyquist frequency required to reduce this image to a low-resolution image, i.e., to decrease the number of pixels is located at a position of the dotted line in FIGS. 5 to 8. The Nyquist frequency is an upper limit frequency that the low-resolution image can express.

Figure 6:
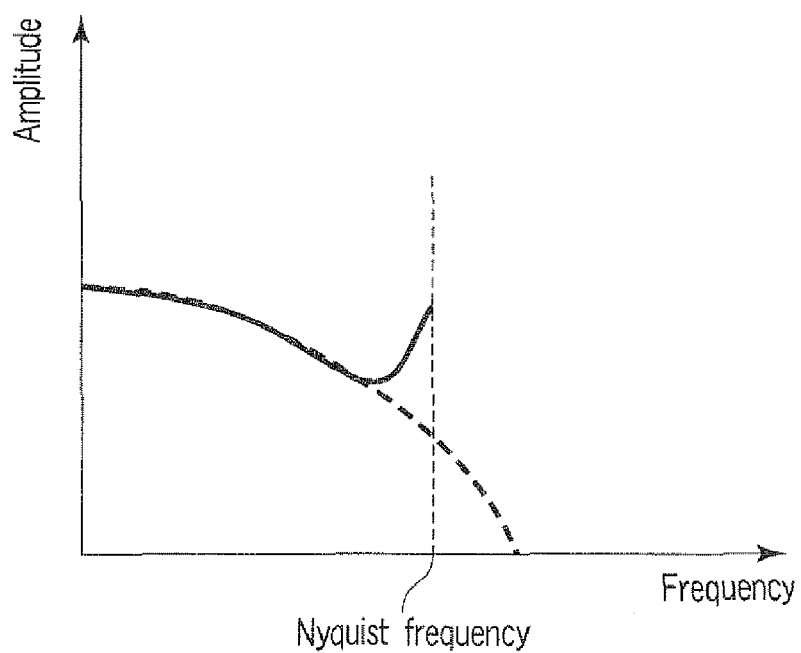
FIG. 6 is a graph showing the spectrum when aliasing has occurred due to low-resolution conversion of the image in FIG. 5.

The solid curve in FIG. 6 shows the spectrum of the low-resolution image after reduction. In this manner, if the original high-frequency image includes frequency components higher than the Nyquist frequency, aliasing occurs near the Nyquist frequency in the low-resolution image (see Suematsu and Yamada, "Image Processing Engineering", Corona Publishing Co., Ltd., pp 60-65). Even when such low-resolution image undergoes resolution enhancement using, e.g., the aforementioned ternary convolution interpolation method, these aliasing components remain, and image quality degradation such as moiré or jaggy, which is not observed in the original high-resolution image, occurs. By contrast, by applying resolution enhancement using degradation inverse conversion, frequency components higher than the Nyquist frequency are reconstructed based on the aliasing components, thus restoring the state shown in FIG. 5.

Figure 7:
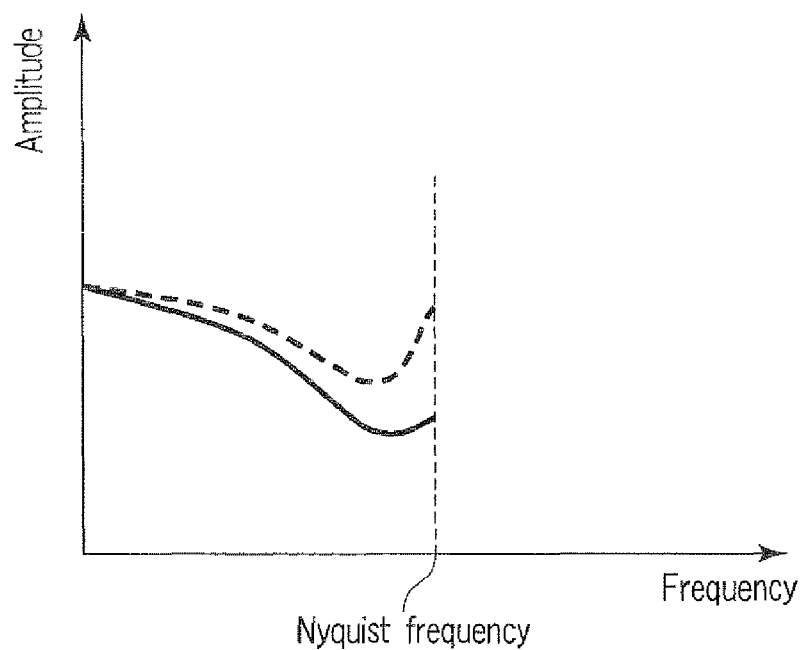
FIG. 7 is a graph showing the spectrum when high-frequency components attenuate in a low-resolution image.
Figure 8:
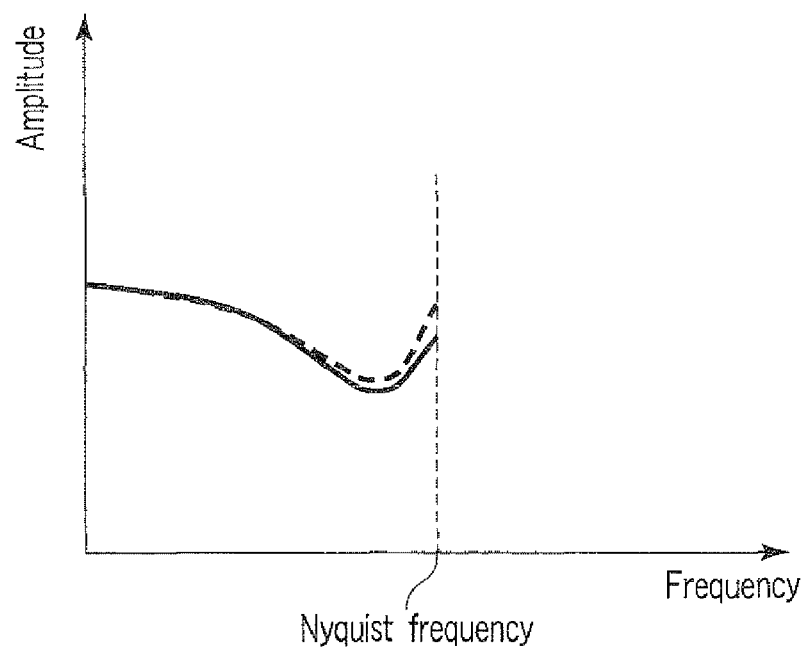
FIG. 8 is a graph showing the spectrum obtained when an edge emphasis unit in FIG. 1 emphasizes high-frequency components of a low-resolution image.

However, some images received by, e.g., a television include those which are captured by a Hi-Vision camera, are reduced to a standard size, and are transmitted after compression. The high-frequency components of these images are attenuated due to compression. Or high-frequency components of even an image captured by a camera are often attenuated by a smoothing filter or the like, which is applied to remove noise, if aliasing components are observed immediately after the image capturing. FIG. 7 shows this state. The high-frequency components of the spectrum indicated by the dotted curve are attenuated, as indicated by the solid curve. Even when resolution enhancement is applied to such image data using degradation inverse conversion, high-frequency components cannot be sufficiently reconstructed, and a sharp image close to the original image cannot be obtained. By contrast, by applying edge emphasis, i.e., by emphasizing high-frequency components in a low-resolution image, the high-frequency components are reconstructed to be close to a state before they are attenuated, as indicated by the solid curve in FIG. 8, and a sharp image can be obtained by the subsequent processing.

The corresponding point detection unit 104 in FIG. 1 will be described below with reference to FIGS. 9 to 17.

Figure 9:
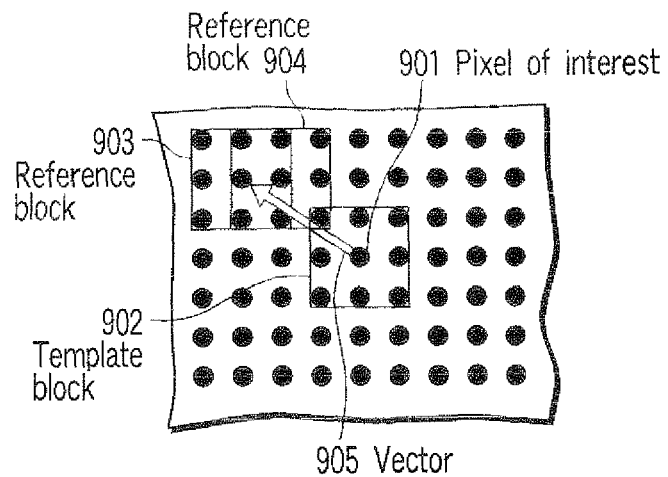
FIG. 9 shows pixels, pixel of interest, template block, and reference block of a low-resolution image.

A method of obtaining a corresponding point will be described below. Closed dots in FIG. 9 are pixels of a low-resolution image, which are allocated on an image plane. These dots have luminance values as their pixel values at respective positions. Assuming that a pixel 901 is selected as a pixel of interest, a template block 902 of 3×3 pixels is set to have the pixel 901 of interest as the center to obtain a corresponding point of this pixel 901 of interest. A reference block 903 to be compared with the template block is set, and an error between pixel value patterns of the template block 902 and reference block 902 is calculated.

As the error between the pixel value patterns, a so-called absolute value error, which is obtained by calculating the absolute values of differences between the pixel values of pixels at corresponding positions, and summing up these absolute values for nine pixels, or a so-called square error using the squares of differences between the pixel values in place of the absolute values of differences between the pixel values, is used. Next, an error between this template block 902 and another reference block 904 is calculated. In this manner, errors are calculated while shifting the position of the reference block pixel by pixel within a predetermined range in the image plane, so as to search for a position of the reference block that minimizes the error.

Figure 10:
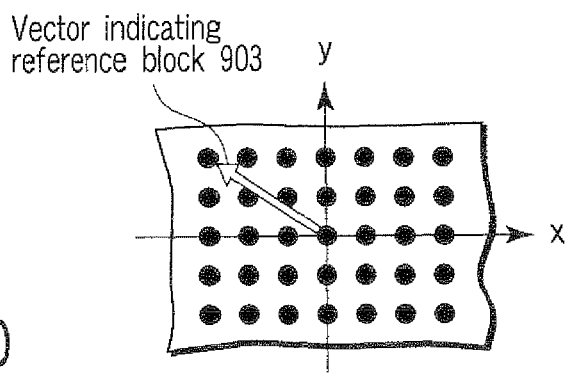
FIG. 10 shows an example of a vector which represents the position of the reference block.
Figure 11:
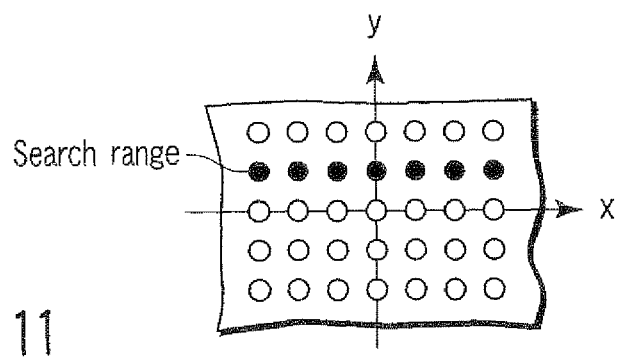
FIG. 11 shows an example of a search range of the reference block.

The position of the reference block is expressed by, for example, a relative vector 905 from the pixel of interest to the center of the reference block. FIG. 10 shows that vector by plotting its horizontal and vertical components as a horizontal coordinate x and vertical coordinate y. FIG. 10 shows a vector (−3, 2) that represents the position of the reference block 903 as an example. FIGS. 11 to 14 show examples of the reference block search range using this vector coordinate space. In each of these figures, the positions of closed dots express a search range. In FIG. 11, reference blocks are sequentially set on a line immediately above a pixel (0, 0) of interest to find a reference block with the smallest error from these seven reference blocks in this example. Then, by applying parabola fitting or conformal fitting using an error at the minimum error position and errors at two neighboring positions (see Shimizu and Okutomi, "Significance and Attributes of Sub-Pixel Estimation on Area-Based Matching", The transactions of the Institute of Electronics, Information end Communication Engineers, D-II, the Institute of Electronics, Information and Communication Engineers, December 2002, Vol. 85, No.

12, pp. 1791-1800), the position of a corresponding point on this line is calculated in a sub-pixel unit. Note that the sub-pixel unit means a unit of a decimal number when a pixel is allocated at a position that assumes integers as horizontal and vertical coordinate values on a two-dimensional plane, i.e., a unit smaller than the interval between neighboring pixels.

Figure 12:
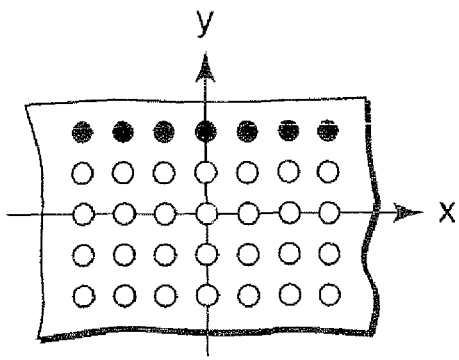
FIG. 12 shows an example of a search range of the reference block.
Figure 13:
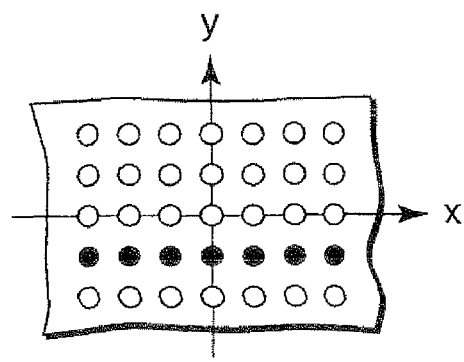
FIG. 13 shows an example of a search range of the reference block.
Figure 14:
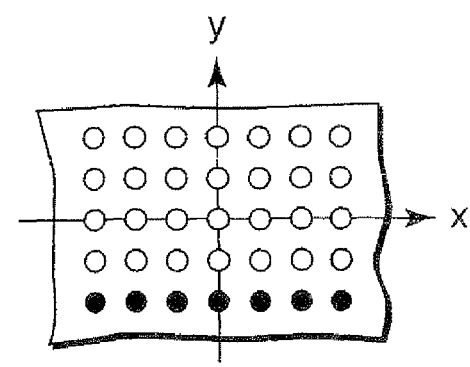
FIG. 14 shows an example of a search range of the reference block.
Figures 15, 16, 17:
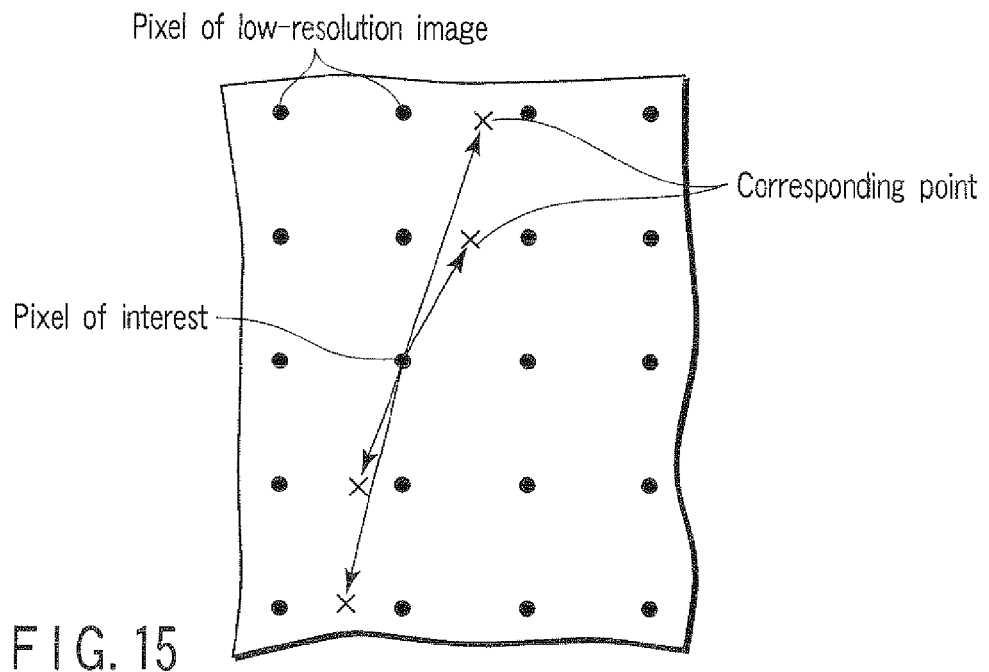
FIG. 15 shows an example of a corresponding point detected by a corresponding point detection unit shown in FIG. 1.
FIG. 16 shows a Sobel filter used to detect a contour in the vertical direction.
FIG. 17 shows a Sobel filter used to detect a contour in the horizontal direction.

Likewise, another corresponding point is calculated using a line indicated by closed dots as a search range in FIG. 12. Corresponding points are also calculated from the search ranges shown in FIGS. 13 and 14. In this way, the four corresponding points are set for one pixel of interest (see FIG. 15). In this example, each search range is defined by a horizontal line. Alternatively, the search range may be switched by shifting a vertical line one by one to find corresponding points. Especially, the direction of a contour line of an object around the pixel of interest may be detected in advance using Sobel filters shown in FIGS. 16 and 17. If the absolute value of the convolution of the filter values in FIG. 16 and pixel values is larger than that obtained using the filter of FIG. 17, it is determined that a contour line is close to a vertical direction, and corresponding points are calculated using the search ranges in FIGS. 11 to 14. If the absolute value obtained by the filter of FIG. 17 is larger than that using the filter in FIG. 16, it is determined that a contour line is close to a horizontal direction, and corresponding points are calculated using search ranges defined by vertical lines. Hence, a plurality of corresponding points can be set along the contour line, and a higher sharpening effect can be obtained.

Figure 18:
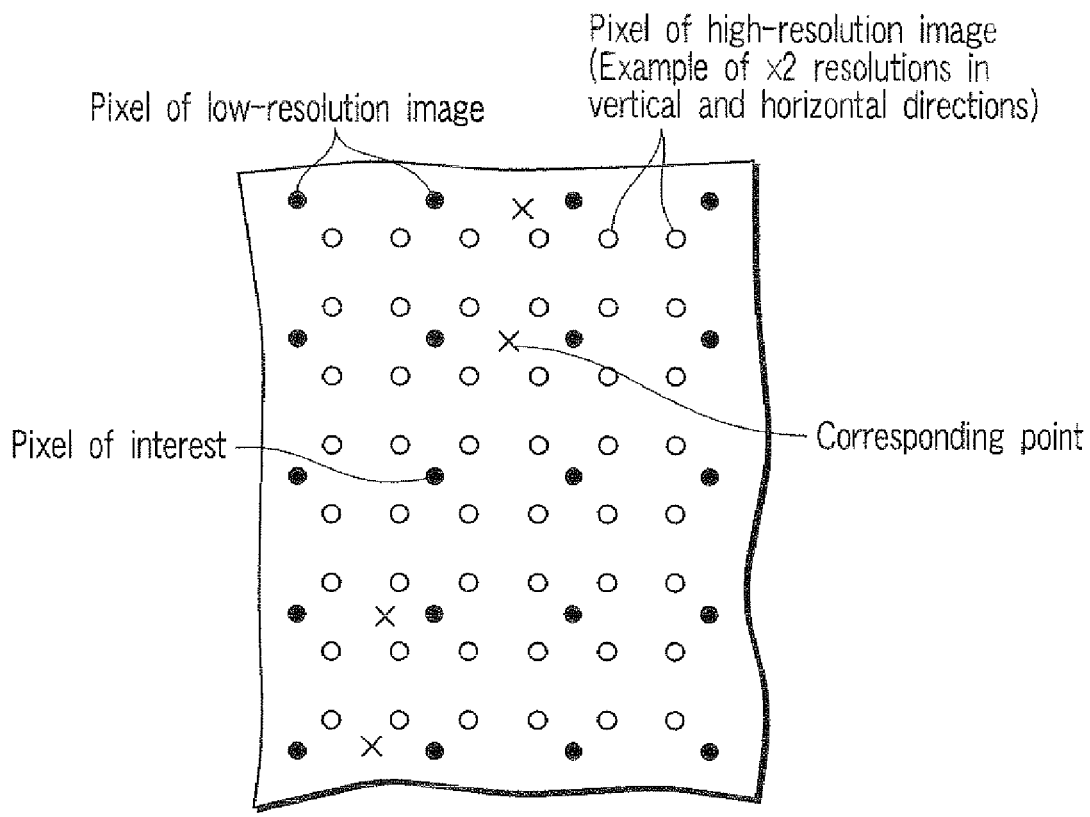
FIG. 18 shows the positional relationship between corresponding points of pixels of a high-resolution image and those of a low-resolution image.
Figure 19:
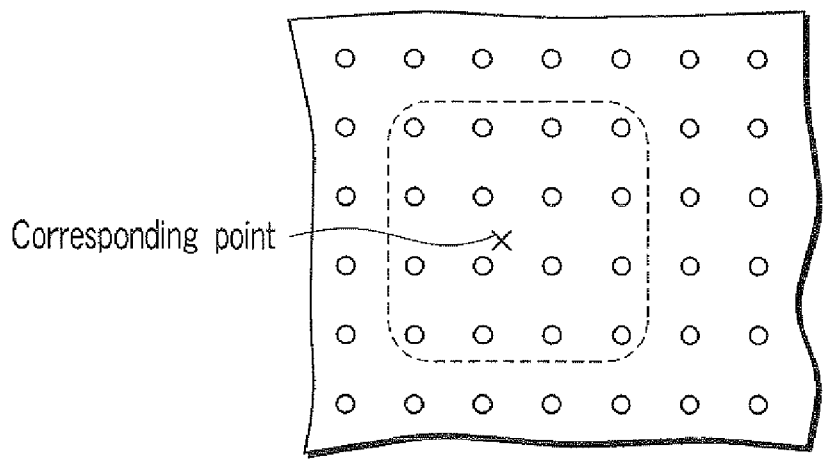
FIG. 19 shows an example of a corresponding point and a range used in sampling at that position.

The pixel value conversion unit 106 in FIG. 1 will be described below with reference to FIGS. 4, 18, and 19.

The pixel value conversion unit 106 converts the corresponding points, which are calculated at positions in the low-resolution image, into those in the high-resolution image, when it sequentially converts the pixel values of pixels of the temporary enlarged image data 105 to gradually sharpen the image. As described above, the positional relationship between the pixels of the low-resolution image and high-resolution image is as shown in FIG. 4. FIG. 18 shows a pixel of interest as one of the pixels of the low-resolution image, and its four corresponding points together. A luminance value obtained by sampling a high-resolution image at the position of a pixel of a low-resolution image is each pixel value of that low-resolution image. In addition, with the resolution enhancement method of the embodiments, assume that a luminance value obtained by sampling the high-resolution image at the position of each corresponding point is equal to the pixel value of the pixel of interest. 10 FIG. 19 shows pixels of the high-resolution image and one corresponding point extracted from FIG. 18. As the pixel values of the high-resolution image, those of the temporary enlarged image data 105 are initially set. Using this pixel value, a sampling value z at the position of the corresponding point is calculated. Sampling uses a predetermined function, called a point spread function, of calculating a weighted mean of the pixel values of the high-resolution image bounded by, e.g., the dotted line. Weighting coefficients are determined according to distances from the corresponding point to respective pixels Next, the difference between the sampling value z and a pixel value y of the pixel of interest is calculated. This pixel of interest is used upon setting that corresponding point. If the difference between z and y is zero, the processing of the next corresponding point starts without any processing. If the difference between z and y is a value other than zero, the pixel values of the high-resolution image bounded by the dotted line are added or subtracted to minimize the difference.

For example, if z−y assumes a positive value, a value obtained by multiplying that difference value by a predetermined coefficient, and multiplying the product by the weighting coefficient used in sampling is subtracted from the pixel value. Or if z−y assumes a negative value, a similarly calculated value is added to the pixel value. If processing for executing this addition or subtraction for each of all pixels of interest is called image conversion, this image conversion is recursively executed several times. In this way, the temporary enlarged image, which has poor sharpness and suffers aliasing initially, is gradually sharpened, and aliasing components are reduced. A high-resolution image that has undergone the image conversion several times is output as output high-resolution image data 109.

Figure 20:
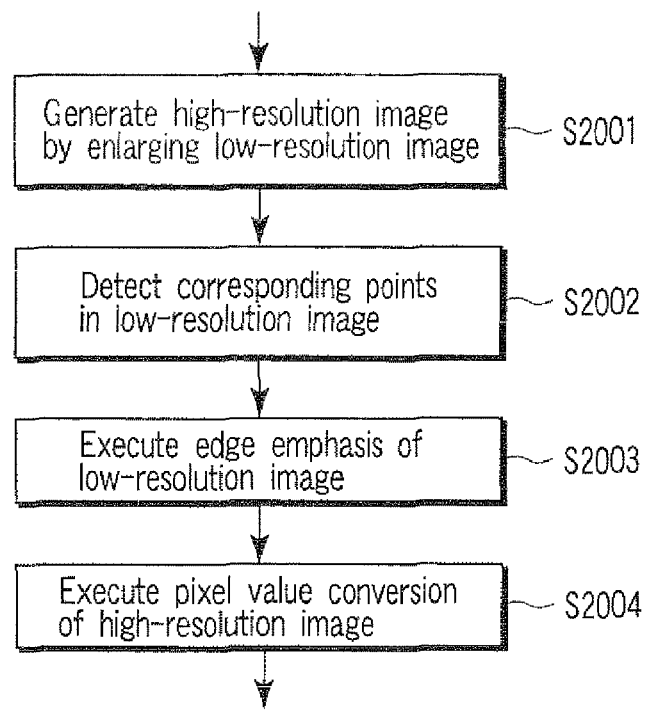
FIG. 20 is a flowchart showing an example of the operation of the resolution enhancement apparatus shown in FIG. 1.

An example of the operation of the resolution enhancement apparatus of this embodiment will be described below with reference to FIG. 20.

The temporary enlargement unit 102 converts an input low-resolution image into a temporary enlarged image by any of a ternary convolution interpolation method, bicubic interpolation method, bilinear interpolation method, nearest neighbor interpolation method, and the like (step S2001).

The corresponding point detection unit 104 detects corresponding points for each pixel from an image plane of the single low-resolution image (step 22002).

The edge emphasis unit 103 executes edge emphasis processing of the low-resolution image using unsharp masking or the like (step 2003).

The pixel value conversion unit 106 repeats image conversion for the high-resolution image generated in step S2001 using the pixel values of the edge-emphasized low-resolution image and information of the positions of the corresponding points, so as to sharpen the high-resolution image, and outputs the result (step S2004).

According to the first embodiment described above, the pixel values of respective pixels of a temporary enlarged image are sequentially converted using low-resolution image data whose high-frequency components are emphasized, and the positions of the corresponding points for respective pixels of the low-resolution image to gradually sharpen the image. Hence, even when an image degraded further after sampling is input, a sharp high-resolution image can be obtained Second Embodiment This embodiment is different from the first embodiment in that the corresponding point detection unit receives image data whose high-frequency components are emphasized. Other points are the same as those in the first embodiment.

A resolution enhancement apparatus of this embodiment will be described below with reference to FIG. 21L.

An edge emphasis unit 2101 acquires low-resolution image data 101, and passes image data 107 whose high-frequency components are emphasized by emphasizing the edge part of the image data 101 to a corresponding point detection unit 2102 and pixel value conversion unit 2103. The edge emphasis units 2101 and 103 have the same processing contents except that they input different data.

The corresponding detection point unit 2102 detects the positions of corresponding points for respective pixels of the image data 107 whose high-frequency components are emphasized, and passes the positions of the corresponding points to the pixel value conversion unit 2103. The corresponding point detection units 2102 and 104 have the same processing contents except that they input different data.

The pixel value conversion unit 2103 and 106 have the same processing contents except for they input different data from the corresponding point detection units.

Figure 21:
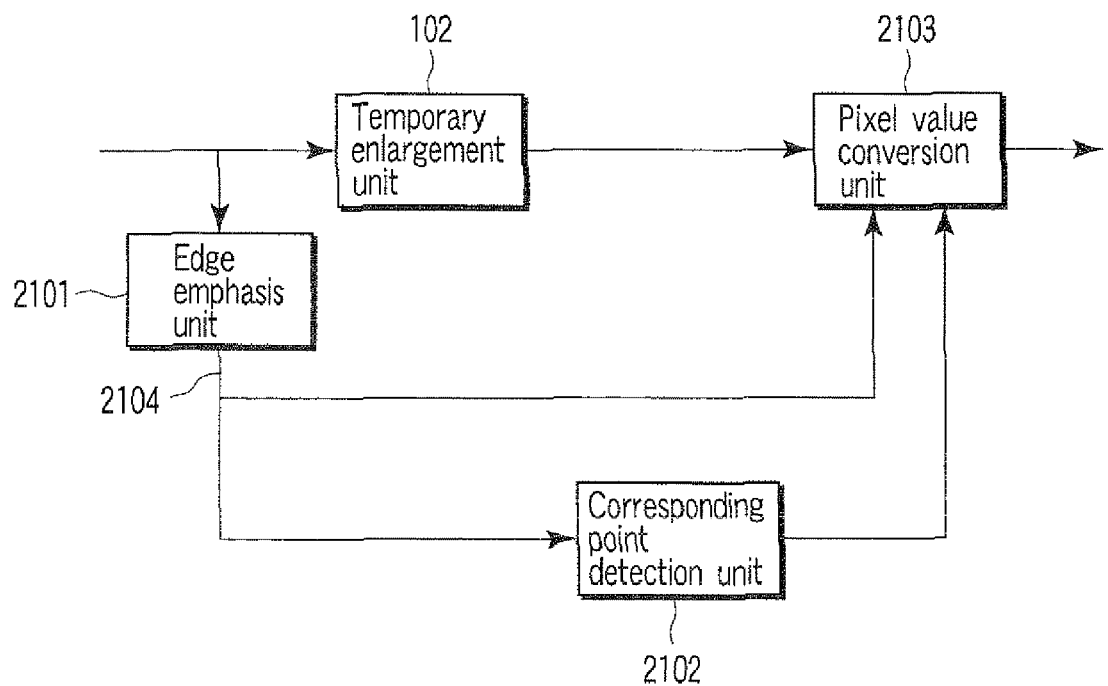
FIG. 21 is a block diagram showing a resolution enhancement apparatus according to the second embodiment.

An example of the operation of the resolution enhancement apparatus shown in FIG. 21 will be described below with reference to FIG. 22.

After step S2001, the edge emphasis unit 2101 executes edge emphasis processing of a low-resolution image by unsharp masking or the like (step S2201).

The corresponding point detection unit 2102 detects corresponding points for respective pixels from an image plane of the low-resolution image that has undergone the edge emphasis processing (step S2202) The pixel value conversion unit 2103 repeats image conversion for the high-resolution image generated In step S2001 using the pixel values of the edge-emphasized low-resolution image and information of the positions of the corresponding points, so as to sharpen the high-resolution image, and outputs the result (step S2203).

According to the second embodiment described above, since the pixel value conversion unit 2103 uses the low-resolution image whose high-frequency components are emphasized, even when high-frequency components of an input image are attenuated, a sharp image can be obtained.

COMPARATIVE EXAMPLE

Figure 24:
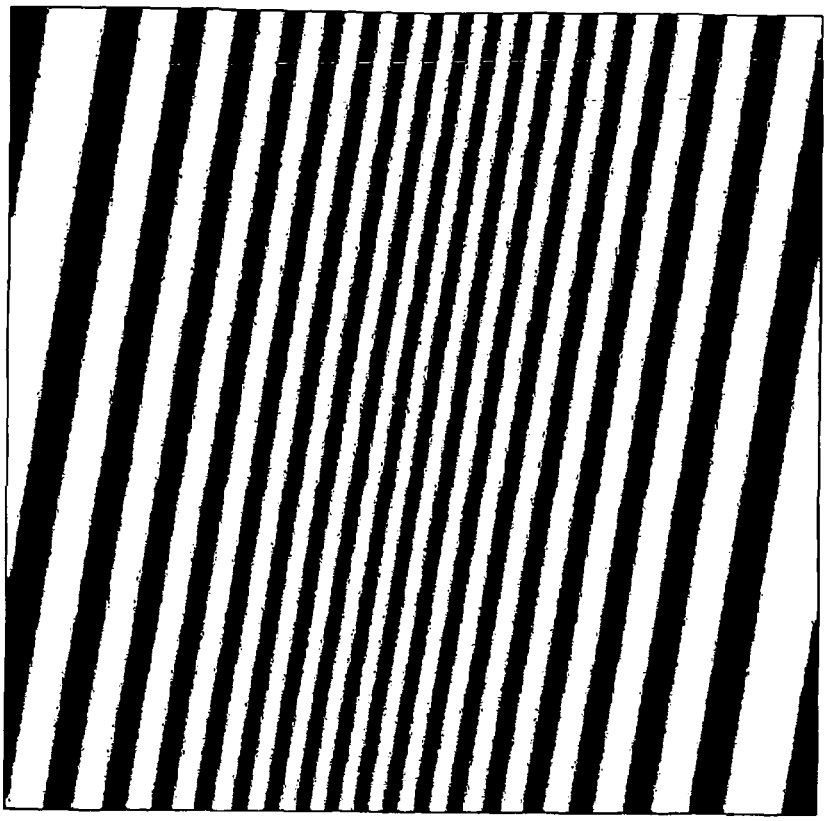
FIG. 24 shows an image which is obtained by applying resolution enhancement to the image shown in FIG. 23 by a conventional resolution enhancement method.
Figure 25:
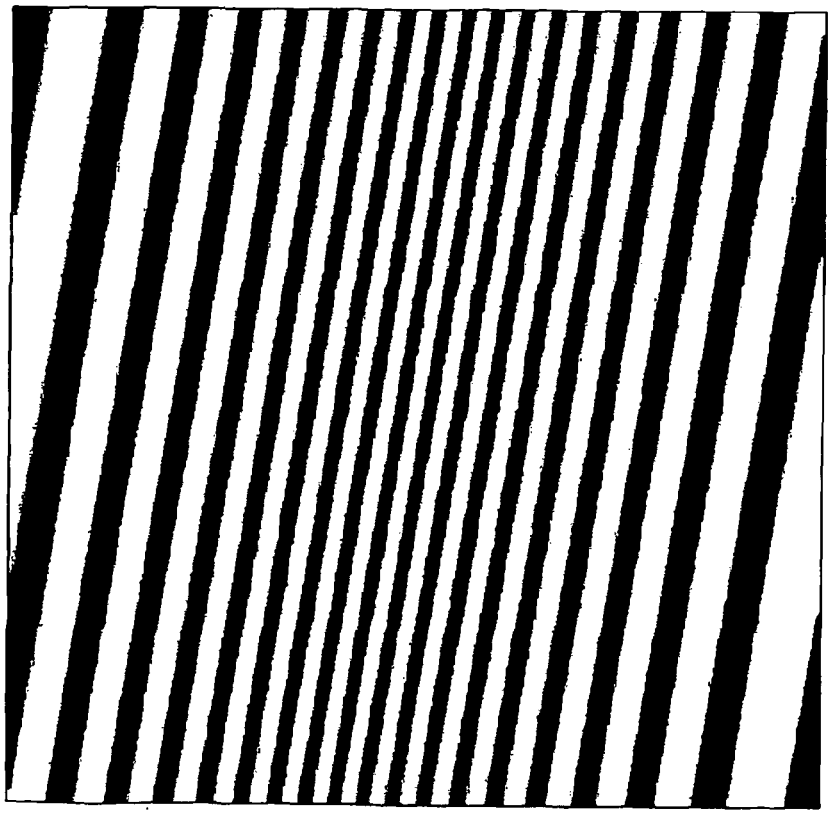
FIG. 25 shows an image which is obtained by applying resolution enhancement to the image shown in FIG. 23 by a resolution enhancement method of this embodiment.

An original image, an image generated by ternary convolution interpolation as the prior art, and an image according to this embodiment will be compared. FIGS. 23, 24, and 25 respectively show the original image, the image generated by ternary convolution interpolation, and the image according to this embodiment.

The image generated by ternary convolution interpolation is obtained by temporarily reducing the original image to a low-resolution image, and then enlarging that low-resolution image as an input to an original resolution by ternary convolution interpolation. An edge is blurred and thin lines (aliasing) are generated in the vertical direction.

By contrast, as can be seen from FIG. 25, the image according to this embodiment is sharper than that generated by ternary convolution interpolation, and is close to the original image.

If edge emphasis is too weak, the sharpening effect is small, and if it is too strong, aliasing remains in an output image, thus deteriorating image quality. Hence, frequency components of a low-resolution image are calculated, stronger edge emphasis is applied with decreasing high-frequency components, and, weaker edge emphasis is applied with increasing high-frequency components, thus obtaining high image quality. For example, unsharp masking can strengthen edge emphasis by increasing the ratio of addition of the difference between the input image and blurred image, and can weaken it by decreasing the ratio.

If aliasing amounts are different in the vertical and horizontal directions of an image plane, the strength of edge emphasis is preferably switched in the vertical and horizontal directions. For example, a field image of a television video picture is divided into top and bottom fields for respective lines, and many aliasing components appear in the vertical direction. Therefore, edge emphasis in the vertical direction weaker than that in the horizontal direction is preferably applied, or edge emphasis in the vertical direction is preferably skipped.

In a flat part including no contour line, since there are no high-frequency components, image quality is high enough if the pixel values of the temporary enlarged image are used Intact. Hence, a contour line is detected from a low-resolution image using the Sobel filter or the like shown in FIG. 16 or 17, and corresponding point detection is skipped for a pixel whose output is smaller than a predetermined value. In this manner, the total number of corresponding points is reduced, and additions or subtractions of pixel values are skipped accordingly, thus reducing the total processing volume.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the genera) inventive concept as defined by the appended claims and their equivalents.

What is claimed is:

1. A resolution enhancement apparatus comprising:
an acquisition unit configured to acquire, from an image source, a first low resolution image in which luminance values at positions of first pixels included in an image plane of the first low resolution image are expressed as first pixel values;
an emphasis unit configured to perform edge emphasis processing on the first low resolution image to obtain a second low resolution image;
a low detection unit configured to detect, using one of the first low resolution image and the second low resolution image, a plurality of corresponding points corresponding to a plurality of image regions each of which is closest to a pixel value pattern included in an interest image region in the first low-resolution image at a precision of a sub pixel unit as a unit smaller than an interval between neighboring pixels, the interest image region being set to have each of the first pixels as a pixel of interest;
a setting unit configured to set each of a plurality of second pixel values for second pixels of the second low resolution image as a sampling value of a luminance value at each corresponding point when one of the second pixels is used as a pixel of interest to obtain a plurality of sampling values;
an enlargement unit configured to enlarge the first low resolution image into a high resolution image comprising third pixels, a number of third pixels being greater than a number of pixels of the first low resolution image; and
a conversion unit configured to execute pixel value conversion which adds or subtracts a plurality of third pixel values in the high resolution image using the third pixels in a direction to reduce errors between the luminance values sampled at the corresponding points and the sampling values.

2. The apparatus according to claim 1, further comprising a high detection unit configured to detect high frequency components of the first low resolution image,
wherein the emphasis unit increases edge emphasis as high frequency components of the first low resolution image are decreased.

3. The apparatus according to claim 2, wherein the emphasis unit changes a strength of the edge emphasis in a vertical direction and a horizontal direction of the image plane.

4. The apparatus according to claim 2, further comprising a contour detection unit configured to detect a contour line of an object in the first low resolution image,
wherein the conversion unit adds or subtracts the third pixel values around the contour line.

5. The apparatus according to claim 1, wherein the emphasis unit changes a strength of the edge emphasis in a vertical direction and a horizontal direction of the image plane.

6. The apparatus according to claim 5, further comprising a contour detection unit configured to detect a contour line of an object in the first low resolution image,
wherein the conversion unit adds or subtracts the third pixel values around the contour line.

7. The apparatus according to claim 1, further comprising a contour detection unit configured to detect a contour line of an object in the first low resolution image,
wherein the conversion unit adds or subtracts the third pixel values around the contour line.

8. A resolution enhancement method comprising:
acquiring, from an image source, a first low resolution image in which luminance values at positions of first pixels included in an image plane of the first low resolution image are expressed as first pixel values;
performing edge emphasis processing on the first low resolution image to obtain a second low resolution image;
detecting, using one of the first low resolution image and the second low resolution image, a plurality of corresponding points corresponding to a plurality of image regions each of which is closest to a pixel value pattern included in an interest image region in the first low-resolution image at a precision of a sub pixel unit as a unit smaller than an interval between neighboring pixels, the interest image region being set to have each of the first pixels as a pixel of interest;
setting each of a plurality of second pixel values for second pixels of the second low resolution image as a sampling value of a luminance value at each corresponding point when one of the second pixels is used as a pixel of interest to obtain a plurality of sampling values;
enlarging the first low resolution image into a high resolution image comprising third pixels, a number of third pixels being greater than a number of pixels of the first low resolution image; and
executing pixel value conversion which adds or subtracts a plurality of third pixel values in the high resolution image using the third pixels in a direction to reduce errors between the luminance values sampled at the corresponding points and the sampling values.

9. The method according to claim 8, further comprising detecting high frequency components of the first low resolution image,
wherein performing the edge emphasis processing increases edge emphasis as high frequency components of the first low resolution image are decreased.

10. The method according to claim 9, wherein performing the edge emphasis processing changes a strength of the edge emphasis in a vertical direction and a horizontal direction of the image plane.

11. The method according to claim 9, further comprising detecting a contour line of an object in the first low resolution image,
wherein executing the pixel value conversion adds or subtracts the third pixel values around the contour line.

12. The method according to claim 8, wherein performing the edge emphasis processing changes a strength of the edge emphasis in a vertical direction and a horizontal direction of the image plane.

13. The method according to claim 12, further comprising detecting a contour line of an object in the first low resolution image,
wherein executing the pixel value conversion adds or subtracts the third pixel values around the contour line.

14. The method apparatus according to claim 8, further comprising detecting a contour line of an object in the first low resolution image,
wherein executing the pixel value conversion adds or subtracts the third pixel values around the contour line.

15. A resolution enhancement method comprising:
enhancing a first low resolution image to obtain a second low resolution image;
detecting corresponding points for points of interest in one or the other of the first and second low resolution images, the detecting comprising, for each respective point of interest, comparing pixel values for a template block of pixels comprising the respective point of interest with pixel values for each of a set of reference blocks of pixels, determining the reference block in the set of reference blocks for which a pixel value difference value is smallest, and calculating, on a sub-pixel basis, a corresponding point for the respective point of interest based on the determined reference block, wherein the sub-pixel basis corresponds to an interval smaller than a distance between neighboring pixels in the one or the other of the first and second low resolution images and wherein each point of interest has multiple corresponding points each determined using a different set of reference blocks of pixels;
enlarging the first low resolution image into a high resolution image; and
converting pixel values for pixels of the high resolution image based on pixel values for the second low resolution image and information regarding the corresponding points.

16. The method according to claim 15, wherein the pixel values are associated with luminance.

17. An apparatus configured to perform the method of claim 15.

* * * * *